(12) United States Patent
Guha et al.

(10) Patent No.: US 11,044,774 B2
(45) Date of Patent: Jun. 22, 2021

(54) SYSTEM AND METHOD FOR TRIGGERING SPLIT BEARER ACTIVATION IN 5G NEW RADIO ENVIRONMENTS

(71) Applicant: Verizon Patent and Licensing Inc., Arlington, VA (US)

(72) Inventors: Ratul Kumar Guha, Warwick, PA (US); Danielle Elizabeth Adamo, Cedar Knolls, NJ (US); Lori E. Fountain, Flemington, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/563,132

(22) Filed: Sep. 6, 2019

(65) Prior Publication Data

US 2021/0076441 A1    Mar. 11, 2021

(51) Int. Cl.
*H04W 76/16*    (2018.01)
*H04W 88/06*    (2009.01)
*H04B 17/327*    (2015.01)
*H04W 28/02*    (2009.01)

(52) U.S. Cl.
CPC .......... *H04W 76/16* (2018.02); *H04B 17/327* (2015.01); *H04W 28/0226* (2013.01); *H04W 28/0278* (2013.01); *H04W 88/06* (2013.01)

(58) Field of Classification Search
CPC ........... H04W 28/085; H04W 36/0022; H04W 36/14; H04W 36/22; H04W 36/30; H04W 52/243; H04W 64/00; H04W 88/06; H04W 28/0226; H04W 28/0278; H04W 76/16
USPC ................................ 370/252, 329, 331, 332
See application file for complete search history.

(56) References Cited

U.S. PATENT DOCUMENTS

| | | | |
|---|---|---|---|
| 2016/0285709 A1* | 9/2016 | Chaudhuri | H04W 52/243 |
| 2020/0092210 A1* | 3/2020 | Thanneeru | H04W 28/085 |
| 2020/0128448 A1* | 4/2020 | Muller | H04W 88/06 |
| 2020/0267681 A1* | 8/2020 | Ferrari | H04W 64/00 |

* cited by examiner

*Primary Examiner* — Harun Chowdhury

(57) ABSTRACT

Systems and methods manage split bearer selection in a multi-RAT dual connectivity environment. A first wireless station receives, from a first device, a first signal measurement for the first wireless station and a second signal measurement for a second wireless station. The first wireless station determines that the second signal measurement indicates that a split bearer for the first device can be supported by the second wireless station and identifies, based on the first signal measurement, a distance category for the first device relative to the first wireless station. The first wireless station determines, based on the second signal measurement, whether the second wireless station supports a sustainable split bearer and initiates a split bearer for the first device using the second wireless station, in response to determining that the second wireless station supports the sustainable split bearer.

20 Claims, 9 Drawing Sheets

US 11,044,774 B2

SYSTEM AND METHOD FOR TRIGGERING SPLIT BEARER ACTIVATION IN 5G NEW RADIO ENVIRONMENTS

BACKGROUND

Fifth Generation (5G) networks may use different frequencies, different radio access technologies, and different core network functions that can provide an improved experience over other wireless networks (e.g., Fourth Generation (4G) networks). However, the transition from other such systems or networks to 5G networks presents a challenge for network service providers to concurrently support users of older technologies and users of the new systems within the limits of the available wireless spectrum. In order to maintain a quality of service across a network, or across multiple networks, network service providers may need to manage different radio technology types simultaneously.

DETAILED DESCRIPTION OF THE PREFERRED EMBODIMENTS

Figure 1:
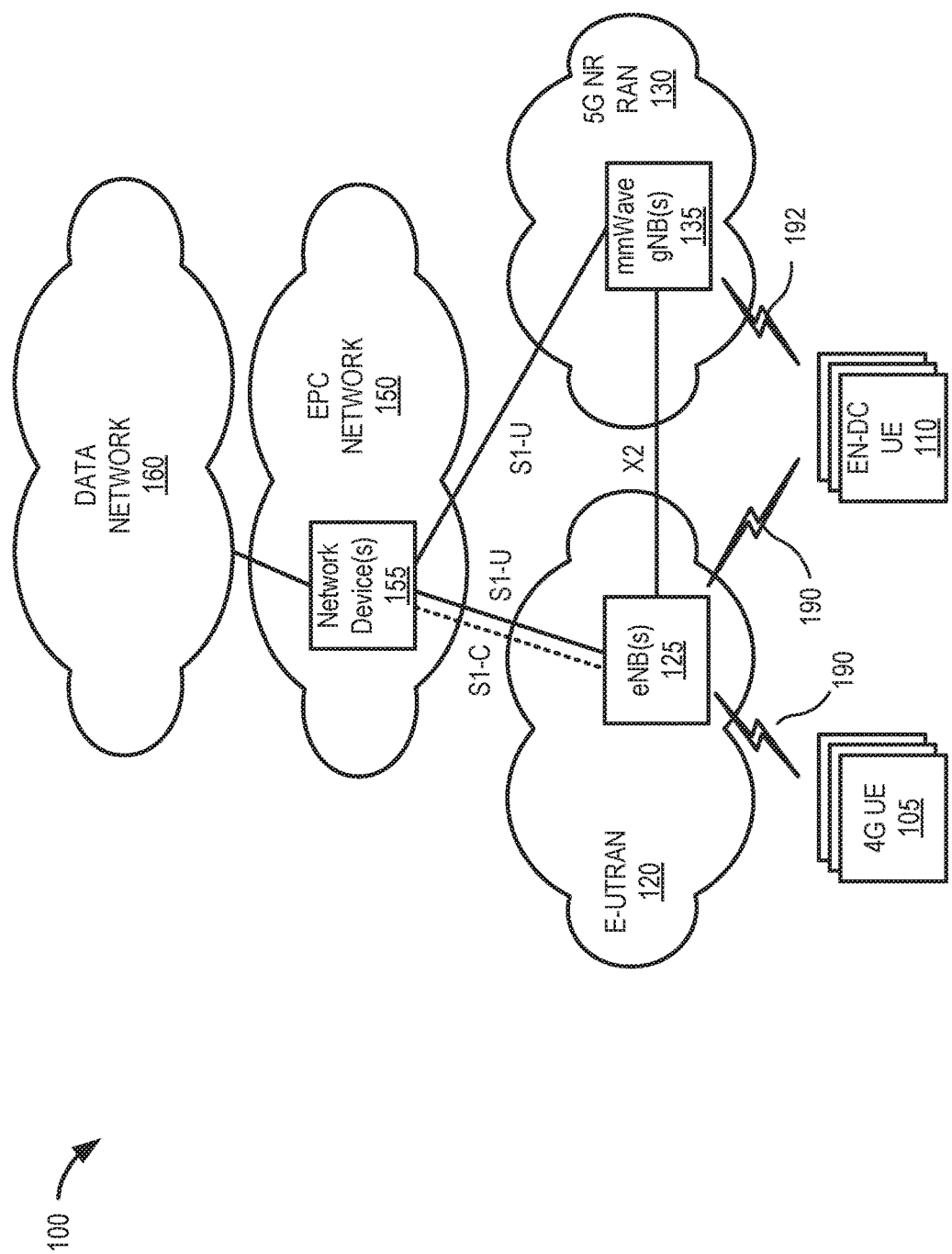
FIG. 1 is a diagram illustrating an exemplary multi-radio access technology (RAT) dual connectivity network environment in which systems and methods described herein may be implemented.

The following detailed description refers to the accompanying drawings. The same reference numbers in different drawings may identify the same or similar elements. Also, the following detailed description does not limit the invention.

Wireless networks, such as Fifth Generation New Radio networks (5G-NR), present opportunities for greater speeds, lower latency, and more connected devices than wireless networks based on earlier technologies. However, 5G-NR networks may not be directly compatible with networks based on 4G standards. For example, 5G-NR networks can use mmWave air interface technology, referred to as 5G-NR radio access technology (RAT), to provide significant improvements in bandwidth and/or latency over other wireless network technology. As used herein, mmWave frequencies may refer to radio frequencies from about 24 GHz to 100 GHz. The 5G NR RAT mmWave air interface may include a high bandwidth that provides high data throughput in comparison to the data throughput of a Fourth Generation (4G) Long Term Evolution (LTE) air interface. However, because of the high mmWave frequencies, the 5G NR RAT air interface may be susceptible to intermittent signal quality degradation due to multipath wave propagation and fading as a result of scattering from terrain objects, such as buildings, foliage, mountains, vehicles, etc.; reflection from bodies of water; ionospheric reflection and/or refraction; atmospheric attenuation and scattering; and/or other types of signal interference. Such variations in signal quality may be particularly important in areas with a low density of 5G coverage, such as during early deployment of 5G base stations (which may be referred to as a gNodeB or gNB).

5G NR coverage using mmWave frequencies may initially be deployed as islands relative to existing air interface coverage. Thus, areas with 5G NR RAT coverage may also provide existing 4G RAT coverage, and end devices enabled to communicate using 5G NR may be able to attach to both a 4G base station and a 5G base station. An end device may be simultaneously attached to a master cell group (MCG), also known as a master eNodeB, and a secondary cell group (SCG). If 5G NR RAT coverage is available, the SCG may correspond to a gNodeB. Dual coverage using 4G and 5G networks may be referred to as interoperability Option 3x.

Dual connectivity solutions are employed when end devices (also referred to as user equipment (UE) or UE devices) can connect to different RAT types simultaneously or to different frequencies in the same RAT. For example, an end device can connect simultaneously to a 5G NR radio access network (RAN) and an Evolved Universal Mobile Telecommunications System (UMTS) Terrestrial Radio Access Network (E-UTRAN) of an LTE network. In such cases, downlink and uplink packets can be transmitted over one or both of the radio access technologies. Thus, end devices can connect simultaneously to 5G NR and E-UTRAN for different bearers (e.g., different logical channels with particular end-to-end quality of service (QoS) requirements) or even split bearers.

During the transition from 4G networks to 5G networks, end devices may switch between different frequency bands, core networks, and RANs that support either 4G or 5G standards. In a mobility context, cellular service providers need to support continuity of voice and data connections, to provide a good user experience for customers while maximizing the benefits of 5G connections. However, switching between the different frequency bands, core networks, and/ or RANs can cause service interruptions, waste network resources, create unnecessary network traffic, etc. when an end device changes network connections mid-session. In some use cases (e.g., data sessions), these service interruptions may not affect the user experience. However, continuity of services such as voice calls, voice/video calls, and live gaming streams present a particular challenge in a 4G/5G mobility context, since these services typically have stringent requirements in terms of latency and user experience. Thus, to minimize service disruptions, voice traffic in these hybrid networks may not be conducted over 5G NR RAT with interoperability Option 3x. However, other types of high bandwidth traffic, such as video calls, streaming video, and video downloads may be conducted using dual connectivity split bearers.

Currently, in a dual connectivity environment, the trigger for end devices to attach to the gNB for a split bearer is controlled by RF measurements that are provided to the master eNodeB by the end device. The master eNodeB receives signal strength measurements from the end device and these measurements are used to determine if an adequate 5G NR (e.g., mmWave) signal exists to initiate a split bearer. Thus, in many cases, the master eNodeB has only an instantaneous view of the UE device when determining if a certain bearer should be activated in split mode. In a mobility context, UE devices near the periphery of a 5G NR cell may indicate acceptable 5G NR coverage that is no longer valid by the time a split bearer is established. Thus, an end device with good instantaneous 5G NR characteristics can be adversely impacted with this current approach, where end devices that momentarily reside in 5G NR coverage can experience delays from unsuccessful split bearer transitions or SCG link failure degrading user experience significantly and wasting network resources.

Systems and methods provided herein ensure reliable connections and the highest possible data rates for services that have continuity requirements (e.g., video calls, gaming, etc.) in 5G NR dual-connectivity environments. A master eNodeB applies a combination of network heuristics and a UE device's RF measurements to trigger split bearer behavior. Using, for example, both 4G and 5G-NR signal measurements from an end device, the eNodeB may determine whether an instantaneous 5G signal measurement is likely to provide a sustainable split bearer.

According to an implementation, a unique split bearer decision table is generated for each sector of a master eNodeB cell. The split bearer decision table maps 4G (LTE) operational path loss (e.g., signal strength) values to mmWave signal strength readings using historical network data. Based on the arrangement of gNodeBs within each eNodeB sector, the combinations of 4G and 5G-NR signal strength values may indicate whether end devices providing such signal strength combinations are likely in a location to support a sustainable split bearer. As the term is used herein, a "sustainable split bearer" may include a split bearer of sufficient duration to permit a stable data transfer between the secondary cell group and the UE device. As described further herein, the split bearer decision tables for each eNodeB sector may initially be empirically calculated and updated with actual device data over time.

Although implementations described herein are primarily described in the context of dual connectivity split bearers, in other implementations, the systems and methods described herein may also apply to multi-connectivity split bears. Furthermore, the systems and methods described herein may also apply to other RAT types and frequencies beyond the LTE and 5G-NR examples provided herein.

FIG. 1 is a diagram illustrating an exemplary multi-RAT dual connectivity network environment in which systems and methods described herein may be implemented. In particular, FIG. 1 is a diagram of an exemplary network environment 100 in which a 5G NR RAT is introduced into an existing LTE network. As shown in FIG. 1, environment 100 may include 4G-capable UE devices 105, Evolved Universal Mobile Telecommunications System Terrestrial Radio Access (E-UTRA)-5G NR Dual Connectivity (EN-DC)-capable UE devices 110, an E-UTRA network including one or more eNodeBs (eNB) 125, a 5G NR RAN 130 including one or more mmWave gNBs 135, an evolved packet core (EPC) network 150 with network devices 155, and an data network 160. 4G UE devices 105 and EN-DC UE devices 110 may be collectively referred to herein as "end devices" or generically as an "end device." Similarly, eNB 125 and mmWave gNB 135 may be collectively referred to herein as "wireless stations" or generically as a "wireless station." According to other embodiments, environment 100 may include additional networks, fewer networks, and/or different types of networks than those illustrated and described herein.

Environment 100 may include links between the networks and between the devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

4G UE device 105 may include a computational device that is capable of communicating with E-UTRAN 120. 4G UE device 105 may enable a user to access EPC network 150 and/or interact with devices in data network 160. 4G UE device 105 may include, for example, a personal communications system (PCS) terminal (e.g., a smartphone that may combine a cellular radiotelephone with data processing and data communications capabilities), a tablet computer, a personal computer, a laptop computer, a gaming console, an Internet of Things (IoT) device, a machine-type communications (MTC) device, or another type of computation or communication devices.

EN-DC UE device 110 may include a computational device having multiple coverage mode capabilities, and thus the capability to communicate simultaneously with different wireless stations (e.g., eNB 125, gNB 135, etc.) using different wireless channels (e.g., channels 190/192 described below) corresponding to the different RANs (e.g., E-UTRAN 120 and 5G NR RAN 130). Thus, EN-DC UE device 110 may be referred to herein as an EN-DC-capable end device when distinguishing from an end device that is not EN-DC-capable, such as 4G UE device 105. EN-DC UE device 110 may include, for example, a cellular radiotelephone, a smart phone, a tablet, any type of Internet Protocol (IP) communications device, a Voice over Internet Protocol (VoIP) device, a laptop computer, a wearable computer, a gaming device, a media player device, or a digital camera that includes communication capabilities (e.g., wireless communication mechanisms such as Wi-Fi). In other implementation, EN-DC UE device 110 may be implemented as a MTC device, an IoT device, a machine-to-machine (M2M) device, etc.

eNB 125 may include a network device that has computational and wireless communication capabilities. In some instances, eNB 125 may be referred to as a "wireless station." eNB 125 may include a transceiver system and other components that allow 4G UE device 105 to wirelessly connect to E-UTRAN 120 and EPC network 150. eNB 125 may include one or more radio frequency (RF) transceivers facing particular directions. For example, base station 125 may include three RF transceivers and each RF transceiver may service a 120° sector of a 360° field of view. eNB 125 may utilize, for example, LTE standard operating frequency bands (e.g., Megahertz frequencies).

According to implementations described herein, eNB 125 may include logic to selectively trigger split bearers based on signal strength readings provided by EN-DC UE devices 110 in any given cell or sector of eNB 125. eNB 125 may interface with EPC network 150 via an S1 interface, for example. More specifically, when serving as a master eNB, eNB 125 may use an S1-C interface for control plane communications and an S1-U interface for user plane communications.

gNB 135 may include a network device and other components that allow EN-DC UE device 110 to wirelessly connect to 5G NR RAN 130 and EPC network 150. According to an implementation, gNB 135 may include multiple distributed components, such as a central unit (CU), a distributed unit (DU), a remote unit (RU or a remote radio unit (RRU)), or another type of distributed arrangement. In the implementation of FIG. 1, gNB 135 may use dedicated mmWave frequencies (e.g., wireless channels 192) that are distinct from lower frequency bands used for 4G RAT (e.g., wireless channels 190). In other implementations, gNB 135 may use shared 4G spectrum or other non-mmWave frequencies. In one implementation, gNB 135 may interface with EPC network 150 via an S1 interface. More specifically, when serving as a secondary gNB, gNB 135 may use an S1-U interface for user plane communications.

In the configuration of FIG. 1, 4G UE device 105 may use a wireless channel to access E-UTRAN 120. The 4G wireless channel may correspond, for example, to physical layer protocols in accordance with 4G radio access technology. More particularly, for example, a wireless channel 190 may correspond to physical layer protocols for 4G RAN standards (e.g., 3GPP standards for 4G air interfaces, etc.).

In the example, wireless channel 192 may correspond, for example, to physical layer protocols in accordance with 5G radio access technology. More particularly, for example, wireless channel 192 may correspond to physical layer protocols for 5G NR standards (e.g., 3GPP standards for 5G air interfaces, etc.). Wireless channels 190/192 may be used to provide communications to/from EN-DC UE device 110 using dual-connectivity with different bearers and/or split bearers. For example, EN-DC UE device 110 may use wireless channels 190 and 192 to access E-UTRAN 120 and 5G NR RAN 130, respectively. According to implementations described herein, 4G UE device 105 and/or EN-DC UE device 110 may support split bearers over more than one carrier frequency band for uplink and/or downlink transmissions.

EPC network 150 may include one or multiple networks of one or multiple types. According to an exemplary implementation, EPC network 150 includes a network pertaining to multiple RANs. For example, EPC network 150 may include a core network, such as the core part of an LTE network, an LTE-A network, a legacy network, and so forth. Depending on the implementation, EPC network 150 may include various network elements that may be implemented in network devices 155. Such network elements may include a mobility management entity (MME), a packet data network gateway (PGW), a serving gateway (SGW), a policy charging rules function (PCRF), a home subscriber server (HSS), as well other network elements pertaining to various network-related functions, such as billing, security, authentication and authorization, network polices, subscriber profiles, and/or other network elements that facilitate the operation of EPC network 150. In the context of a 4G network that is configured to support 5G-NR RAT, EPC network 150 may include one or more network devices 155 with combined 4G and 5G functionality, such as a session management function with PDN gateway-control plane (SMF+PGW-C), a user plane function with PDN gateway-user plane (UPF+PGW-U), and a combined unified data management function and home subscriber server (UDM+HSS).

Data network 160 may include a packet data network (PDN), a local area network (LAN), a wide area network (WAN), a metropolitan area network (MAN), an optical network, a cable television network, a satellite network, an ad hoc network, a telephone network (e.g., the Public Switched Telephone Network (PSTN) or a cellular network), an intranet, or a combination of networks. Some or all of packet data network 160 may be managed by a provider of communication services that also manages wireless stations 125/135. Data network 160 may allow the delivery of Internet Protocol (IP) services to end devices 105/110, and may interface with other external networks. Data network 160 may include one or more server devices and/or network devices, or other types of computation or communication devices. In some implementations, data network 160 may include an IP Multimedia Sub-system (IMS) network (not shown in FIG. 1). An IMS network may include a network for delivering IP multimedia services and may provide media flows between end devices 105/110 and external IP networks or external circuit-switched networks (not shown in FIG. 1).

FIGS. 2A-2D are diagrams illustrating exemplary cell coverage areas in an area 200 of environment 100. A "cell" may include a coverage area served by a wireless station (e.g., one of eNBs 125 or gNB 135) using a particular frequency band. Thus, in some cases, a cell and the wireless station servicing the cell may be referred to interchangeably.

Figure 2A:
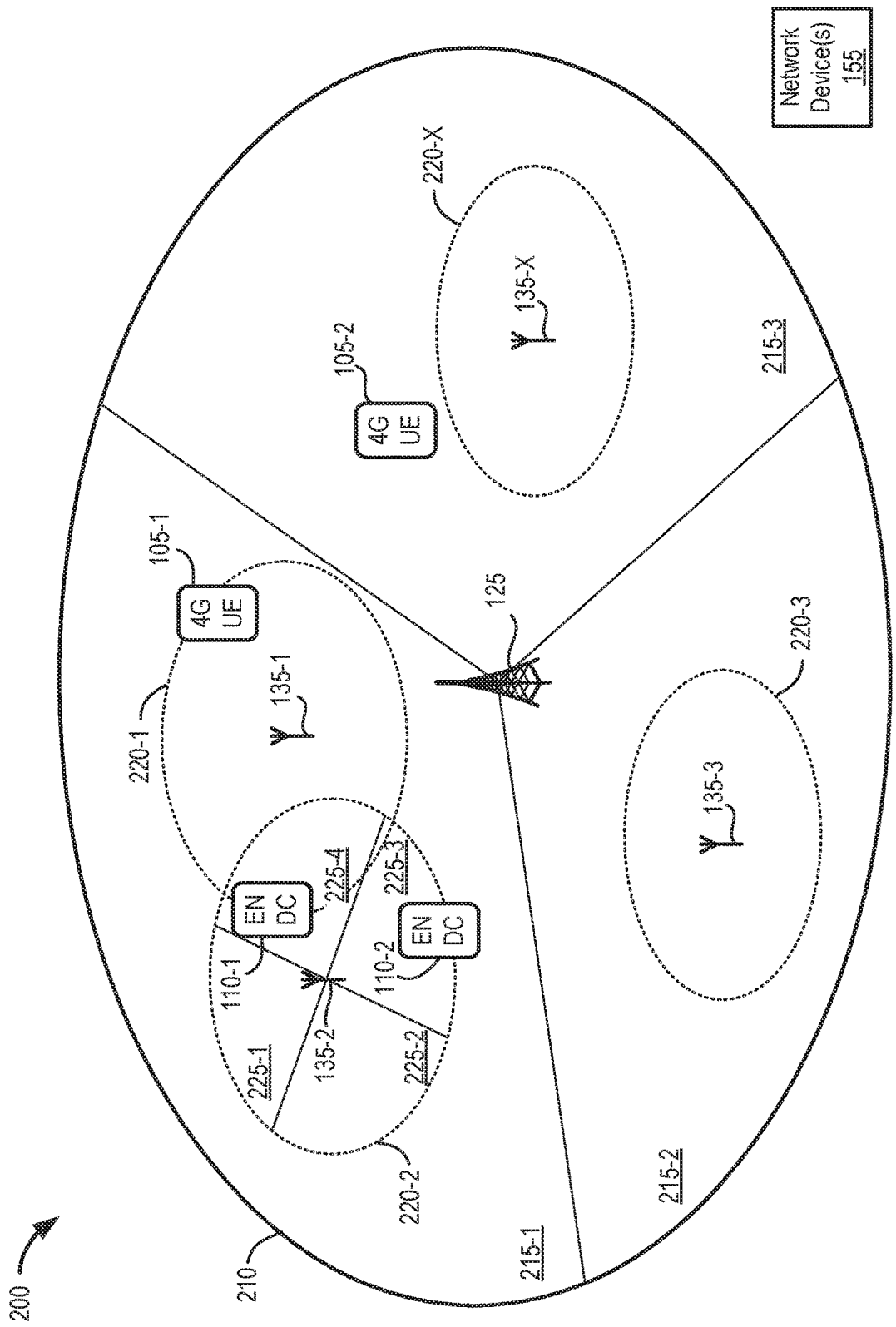
FIGS. 2A-2D are diagrams illustrating exemplary communications in a multi-RAT dual connectivity network environment within a millimeter wave (mmWave) coverage area that may correspond to a portion of the network environment of FIG. 1.

Referring to FIG. 2A, area 200 includes a 4G cell 210 overlapping multiple 5G cells 220-1 through 220-X (referred to herein collectively as 5G cells 220). 4G cell 210 may be serviced by an eNB 125, while each 5G cell 220 may be serviced by a corresponding gNB 135. In an exemplary implementation, cell 210 may correspond to an LTE-based cell having a relatively large coverage area supporting LTE communications devices that operate in a particular frequency. According to an implementation, each cell 210 may include multiple sectors 215 (e.g., sectors 215-1, 215-2, 215-3). Each of cells 220 may correspond to a 5G NR cell that has a smaller coverage area than cell 210 and operates in a different frequency band (e.g., mmWave frequency) than cell 210. According to an implementation, each cell 220 may include multiple sectors 225 (e.g., sectors 225-1, 225-2, 225-3, 225-4 of exemplary cell 220-2.)

Area 200 may include multiple end devices 105/110. Assume that end devices 105/110 may move within the area of 4G cell 210 and between 5G cells 220. A 4G cell 210 (e.g., corresponding to E-UTRAN 120 using eNB 125) may serve as master cell group, and a 5G NR cell (e.g., corresponding to 5G NR RAN 130 using a gNB 135) may serve as a secondary cell group when available. Each eNB 125 and gNB 135 may communicate with each other and with network devices 155 in EPC 150.

Figure 2B:
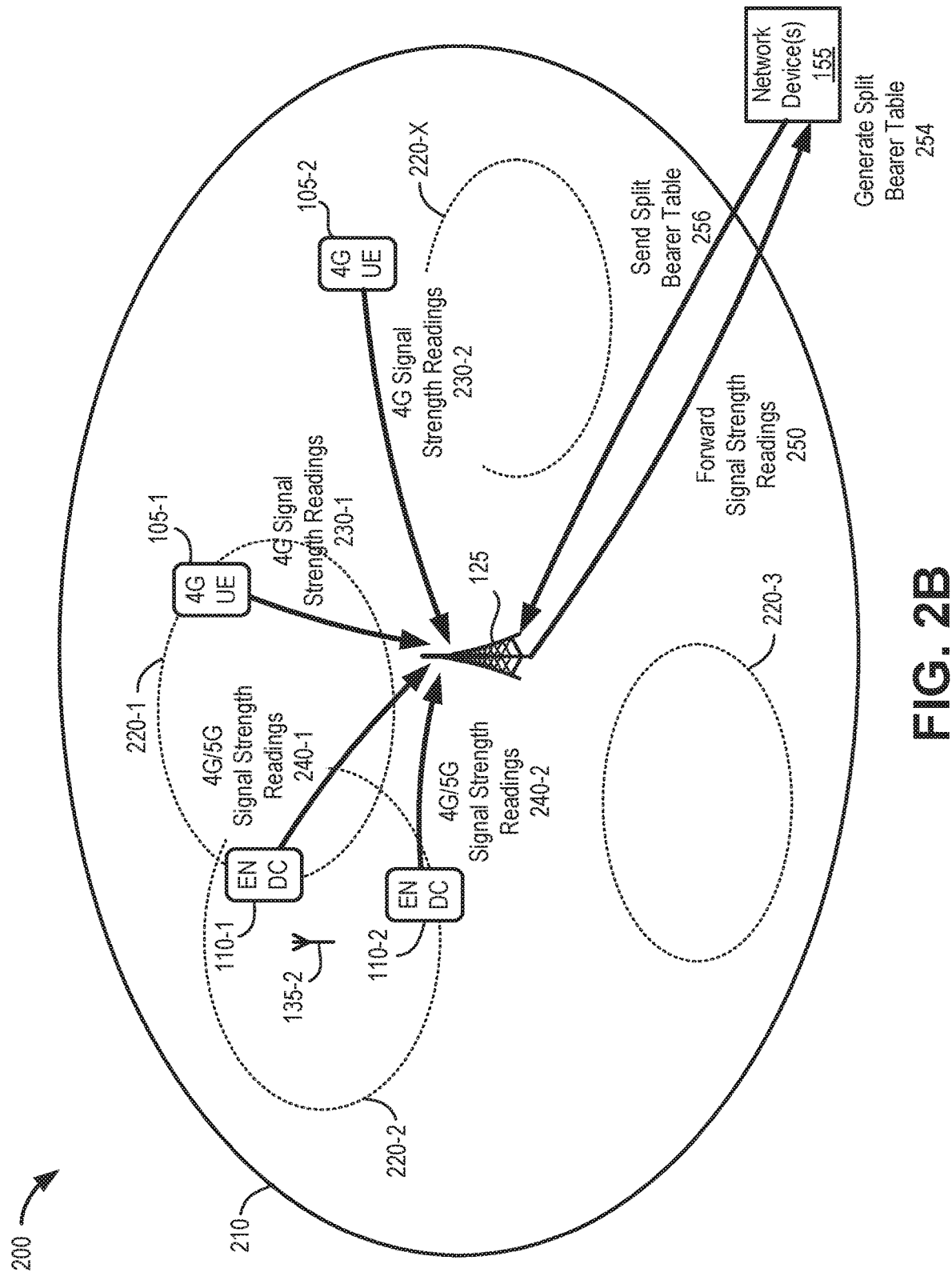

Referring to FIG. 2B, end devices 105/110 may also monitor a paging channel to detect incoming calls and acquire system information. When in a radio resource control (RRC) connected mode, end device 105/110 may provide a wireless station 125/135 with downlink channel quality and neighbor cell information, so that E-UTRAN 120 may, for example, assist end device 105/110 to implement a split bearer. Particularly, end devices 105/110 may measure parameters associated with a current cell to which end device 105/110 is attached, as well as the neighboring cells. The measurements maybe uploaded to the master eNB 125. In the example of FIG. 2B, the measurements may include 4G signal strength readings 230-1, 230-2 from 4G UE devices 105 and 4G/5G signal strength readings 240-1, 240-2 from EN-DC UE devices 110. 4G signal strength readings 230 may include RF data for E-UTRAN 120 relative to the location of the particular 4G UE device 105. For example, 4G signal strength readings 230 may include a Reference Signal Receive Power (RSRP) value associated with eNB 125. 4G/5G signal strength readings 240 may include RF data for E-UTRAN 120 and one or more 5G NR RANs 130 relative to the location of the particular EN-DC UE device 110. For example, 4G/5G signal strength readings 240 may include a RSRP value associated with eNB 125 and another RSRP value associated with gNB 135.

eNB 125 may receive 4G signal strength readings 230-1, 230-2 and 4G/5G signal strength readings 240-1, 240-2. eNB 125 may forward the collected signal readings 250 to one or more network devices 155. Network devices 155 may receive the collected signal readings and use the collected signal readings to generate a split bearer decision table 254. As described further herein, the split bearer decision table may include signal strength distance categories (or bins) that may be correlated to determinations for triggering a split bearer mode. The determinations may be customized for each master eNB 125 or for individual sectors within each cell 210. In other words, each eNB 125 may have a different version of the split bearer decision table, which may be updated as changes occur within cell 210 (e.g., new cells 220 are introduced, physical structures added, etc.). According to an implementation, the split bearer decision table may be generated from actual data (e.g., from 4G/5G signal strength readings 240) and estimations of mmWave propagation levels based on 4G signal strength readings 230.

Network devices 155 may send the split bearer decision table 256 to eNB 125. eNB 125 may, for example, store the split bearer decision table in a local memory and may use the split bearer decision table to assist in determining whether or not to initiate a split bearer for EN-DC UE devices 110.

Figure 2C:
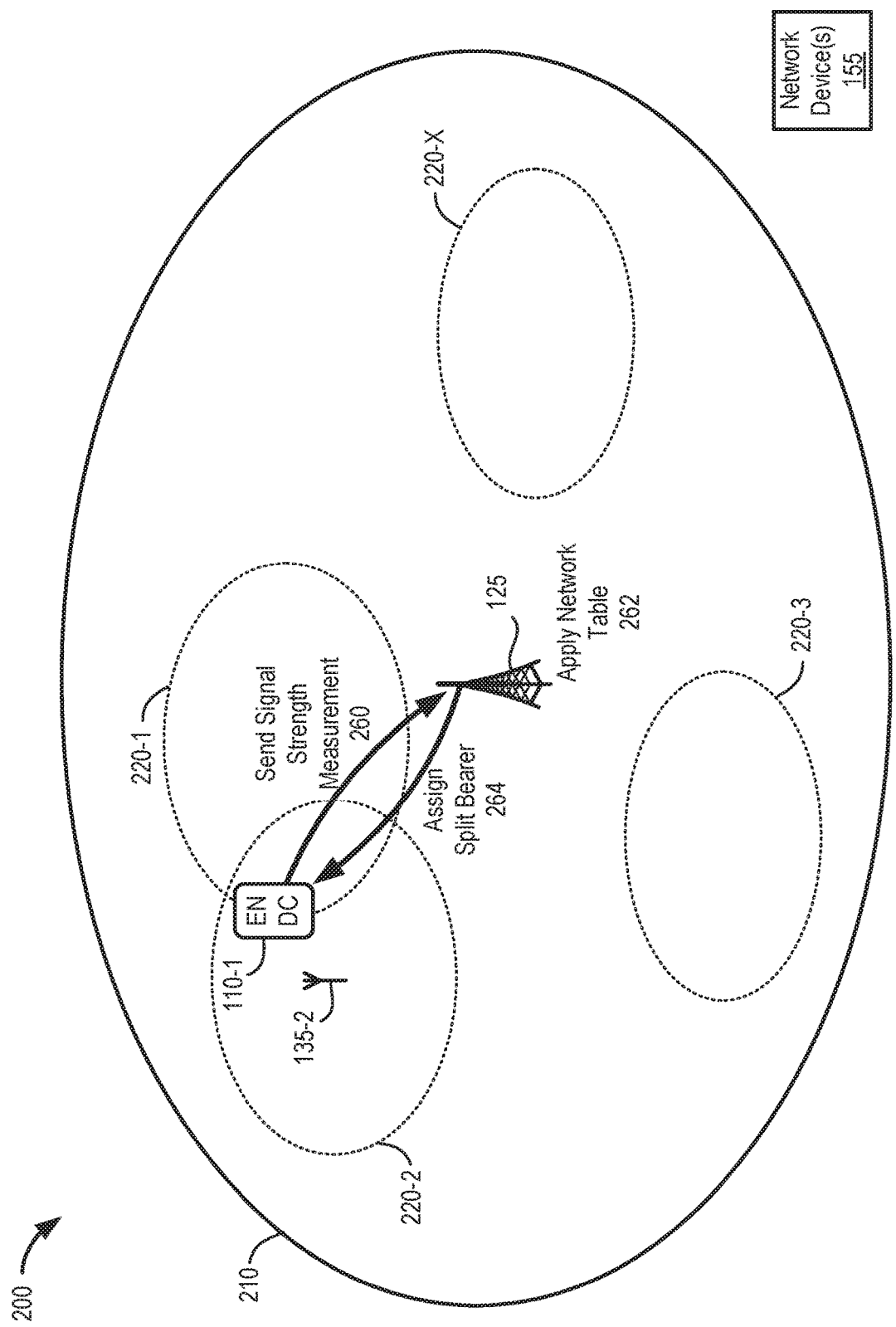
Figure 2D:
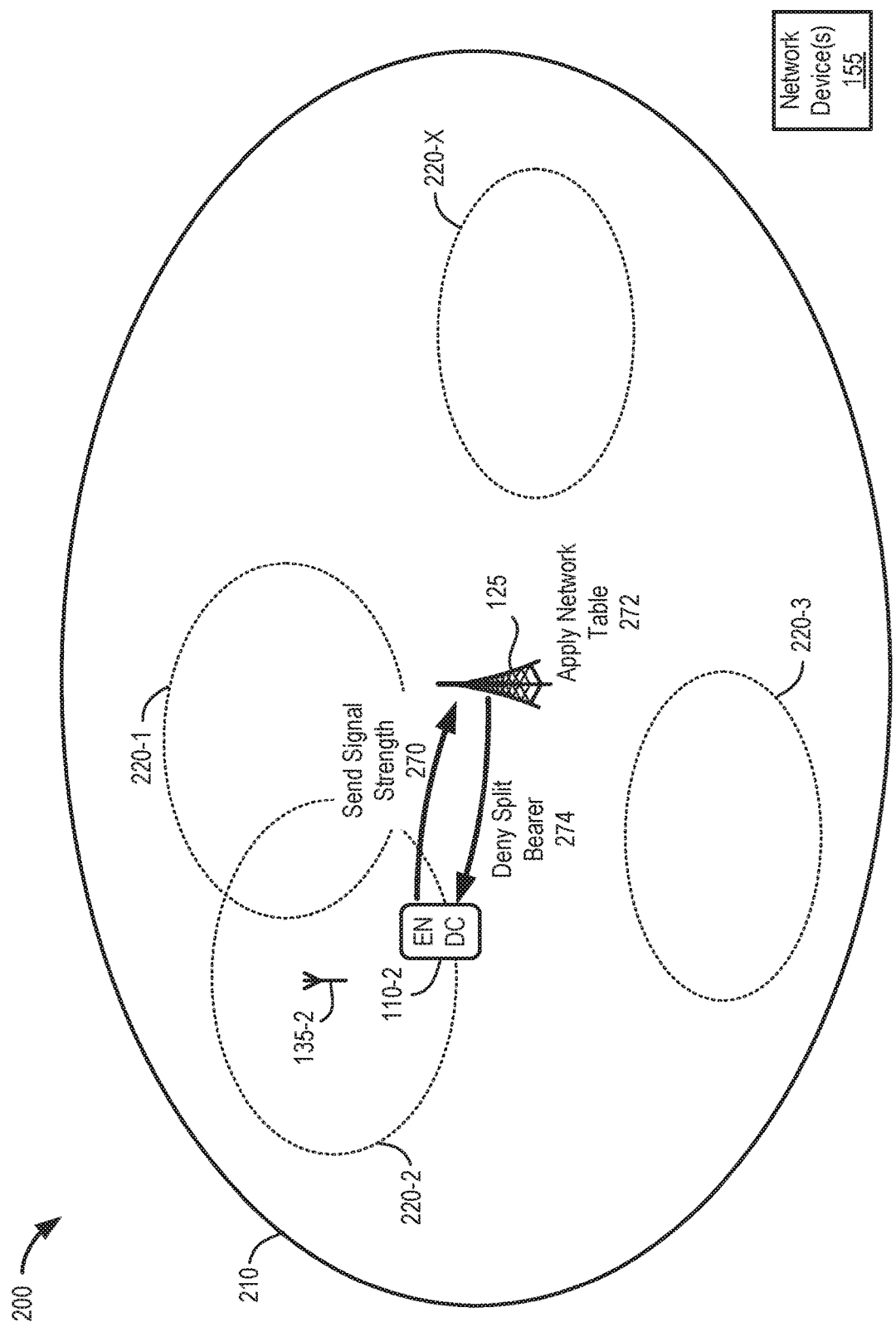

FIGS. 2C and 2D illustrate applications of split bearer decisions in area 200, according to an implementation. Referring to FIG. 2C, EN-DC UE device 110-1 may provide a signal strength measurement 260 to master eNB 125. For example, signal strength measurement 260 may include a RSRP value associated with eNB 125 and another RSRP value associated with gNB 135-1 or gNB 135-2. In the example of FIG. 2C, EN-DC UE device 110-1 would be at low risk for loss of 5G NR connectivity, given its location within overlapping cells 220-1 and 220-2. Master eNB 125 may apply network tables values 262 based on the EN-DC UE device 110-1 signal strength measurements, along with network heuristic data, to the split bearer decision table and select to transition a bearer for EN-DC UE device 110-1 to split mode. Thus, eNB 125 may assign 264 a split bearer for EN-DC UE device 110-1.

Referring to FIG. 2D, EN-DC UE device 110-2 may provide a signal strength measurement 270 to master eNB 125. For example, signal strength measurement 270 may include a RSRP value associated with eNB 125 and another RSRP value associated with gNB 135-2. In the example of FIG. 2D, EN-DC UE device 110-2 would be at high risk for loss of 5G NR connectivity, given its location at the edge of cell 220-2. Master eNB 125 may apply network table values 272 from the EN-DC UE device 110-2 signal strength measurements, along with network heuristic data, to the split bearer decision table. Although the EN-DC UE device 110-2 signal strength measurements may be similar to those provided by EN-DC UE device 110-1, eNB 125 may determine not to transition a bearer for EN-DC UE devices 110 to split mode based on the heuristic data in the split bearer decision table. Thus, eNB 125 may deny 274 a split bearer for EN-DC UE device 110-2.

Figure 3:
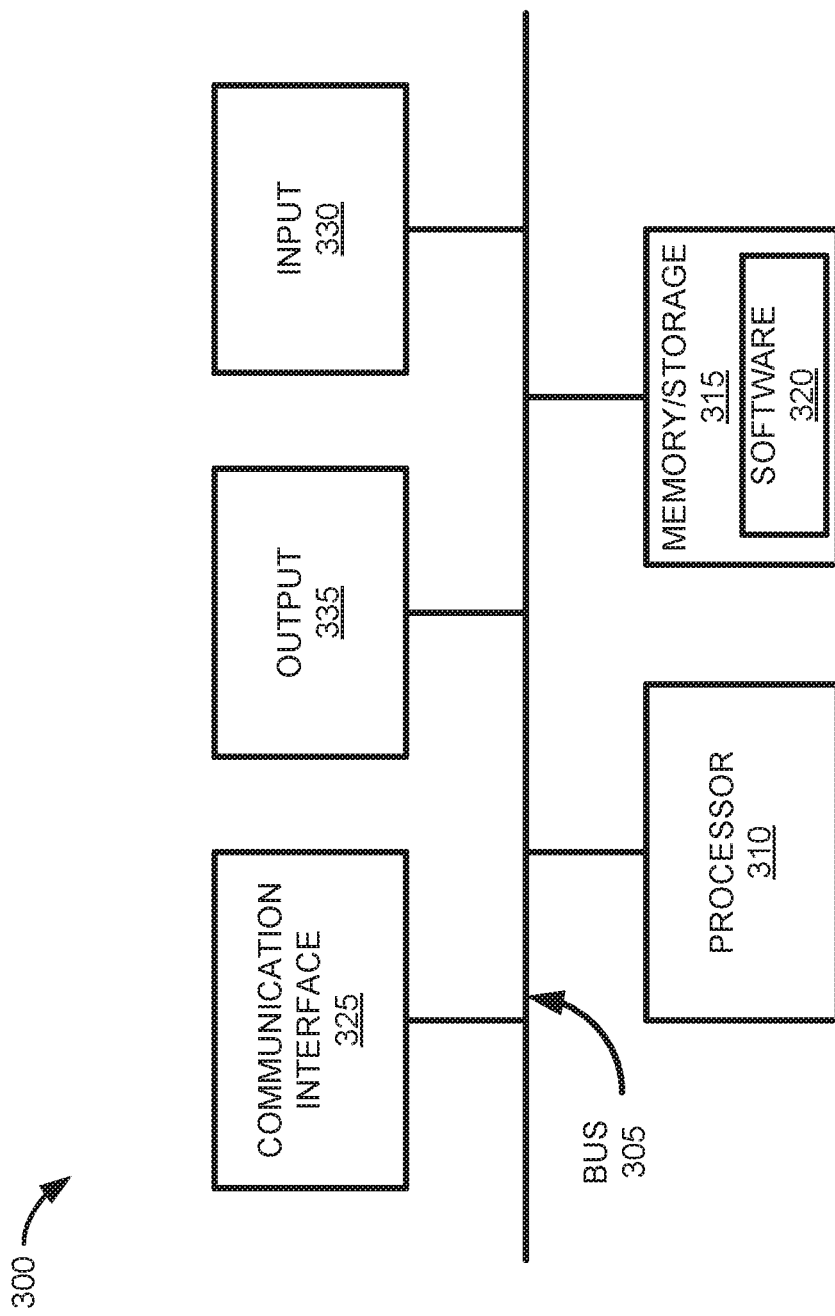
FIG. 3 is a diagram illustrating exemplary components of a device that may correspond to one or more of the devices illustrated and described herein.

FIG. 3 is a diagram illustrating exemplary components of a device 300 that may correspond to one or more of the devices described herein. For example, device 300 may correspond to components included in end device 105/110, wireless stations 125/135, or network devices 155. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource). Processor 310 may control the overall operation or a portion of operation(s) performed by device 300.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium. Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, wireless stations 125/135 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
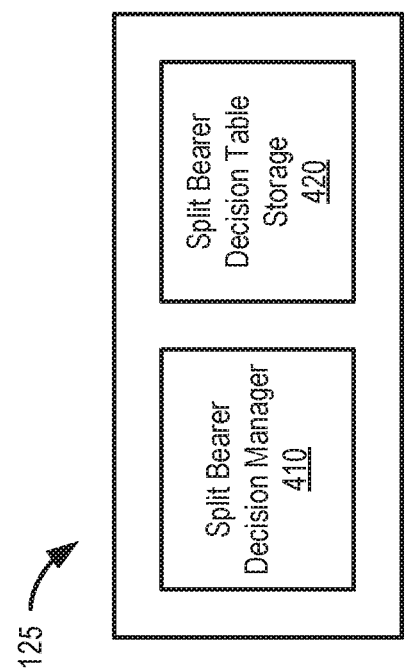
FIG. 4 is a diagram of logical components of a base station of FIG. 1, according to an implementation described herein.

FIG. 4 is a block diagram illustrating logical components of eNB 125. The logical components of FIG. 4 may be implemented, for example, by processor 310 in conjunction with memory 315/software 320. In another implementation, logical components of eNB 125 may be implemented, for example, as a virtual machine or virtual function. As shown in FIG. 4, eNB 125 may include a split bearer decision manager 410, and split bearer decision table storage 420. The logical components of FIG. 4 are described below in the context of gNB 135. In other implementations, a gNB 135 (or another wireless station 125/135) may include similar logical components.

Split bearer decision manager 410 may make determinations to initiate a split bearer for EN-DC UE device 110. Generally, if EN-DC UE device 110 reports that a 5G NR signal is found that meets criteria for RF signal strength and network heuristics, split bearer decision manager 410 may communicate to gNB 135 (e.g., via an X2 interface) and provide the necessary parameters for gNB 135 to establish a connection to EN-DC UE device 110. Once the gNB 135 confirms to eNB 125 that a connection setup has been established, eNB 125 may then forward a part of the incoming user data the gNB 135 for transmission to EN-DC UE device 110.

According to an implementation, split bearer decision manager 410 may apply a split bearer decision table to detect, for example, signal reports with good instantaneous 5G NR characteristics that may have a high risk for loss of 5G NR connectivity. An example split bearer decision table is described further in connection with FIG. 6.

Split bearer decision table storage 420 may store a current version of the split bearer decision table for use by split bearer decision manager 410. According to one implementation, split bearer decision table storage 420 may include a cached split bearer decision table and/or a stored split bearer decision table. The cached version may be used by split bearer decision manager 410, while the stored version may be updated and/or replaced when changes are available without disrupting activity by eNB 125. Split bearer decision table storage 420 may receive new or updated split bearer decision tables from, for example, a network device 155 in EPC 150.

Figure 5:
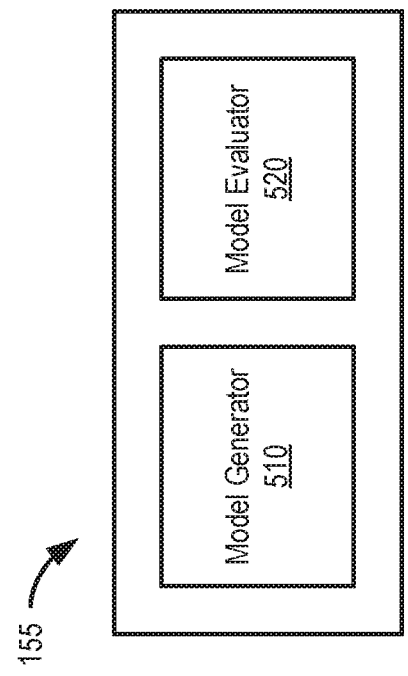
FIG. 5 is a diagram of logical components of a network device of FIG. 1, according to an implementation described herein.

FIG. 5 is a block diagram illustrating logical components of network device 155. The logical components of FIG. 5 may be implemented, for example, by processor 310 in conjunction with memory 315/software 320. In another implementation, logical components of network device 155 may be implemented, for example, as a virtual machine or a virtual function. As shown in FIG. 5, network device 155 may include a model generator 510, and a model evaluator 520.

Model generator 510 may retrieve signal data (e.g., signal strength readings) from end devices 105/110 and generate split bearer decision tables for use by master eNBs 125. An example split bearer decision table is described further in connection with FIG. 6. According to an implementation, a split bearer decision table may be customized for each sector 215 of a cell 210. The split bearer decision table may map 4G signal strength values (e.g., operational path loss) within a sector 215 to mmWave signal strength readings. Model generator 510 may apply historical direct signal strength measurements from EN-DC UE devices 110 and calculated signal strength measurements from 4G UE devices 105 to generate a split bearer decision table. Additionally, model generator 510 may apply empirical data based on the physical layout of wireless stations 125/135 within a sector 215 and adjacent sectors 215.

According to one implementation, model generator 510 may create an estimation of mmWave propagation levels based on historical measurement reports from 4G UE devices 105. For example, given an actual master path loss ($PL_M$) measurement for a 4G frequency and the corresponding mmWave (5G NR) frequency in a sector, model generator 510 may estimate secondary cell path loss ($PL_S$) for the same distance using the equation:

$$PL_S = Pl_M + 20*\log_{10}(F_S) - 20*\log_{10}(F_M)$$

where $F_S$ is the center frequency of the mmWave (5G NR) band used by gNB 135 and $F_M$ is the center frequency of the 4G band used by eNB 125.

Model evaluator 520 may check for accuracy of each split bearer decision table as applied by eNBs 125. For example, model evaluator 520 may be integrated in a feedback loop with split bearer connection data from EN-DC UE devices 110 in storage 420. Model evaluator 520 may apply and analyze actual data from EN-DC UE devices 110 as well as predicted data from 4G UE devices 105 to improve accuracy of the split bearer decision table. Model evaluator 520 may retrieve network data to detect whether a split bearer decision was effective. For example, model evaluator 520 may determine that a split bearers for end devices deemed to have low risk of 5G NR connectivity loss failed to establish or maintain 5G NR connectivity. As another example, model evaluator 520 may determine that, in an area where split bearers are denied for end devices deemed to have high risk of 5G NR connectivity loss, the end devices tend to establish split bearers shortly thereafter. Thus, each split bearer may be continuously tuned based on actual network data.

According to an implementation, model evaluator 520 may use machine learning to automatically evaluate and adjust parameters for a split bearer decision table. For example, the machine learning algorithms may fine tune signal strength thresholds for split bearer decisions to allow for improved predictions of 5G NR connectivity. Model evaluator 520 may, for example, periodically or dynamically provide updated parameters for model generator 510 to store and distribute to a respective eNB 125.

Figure 6:
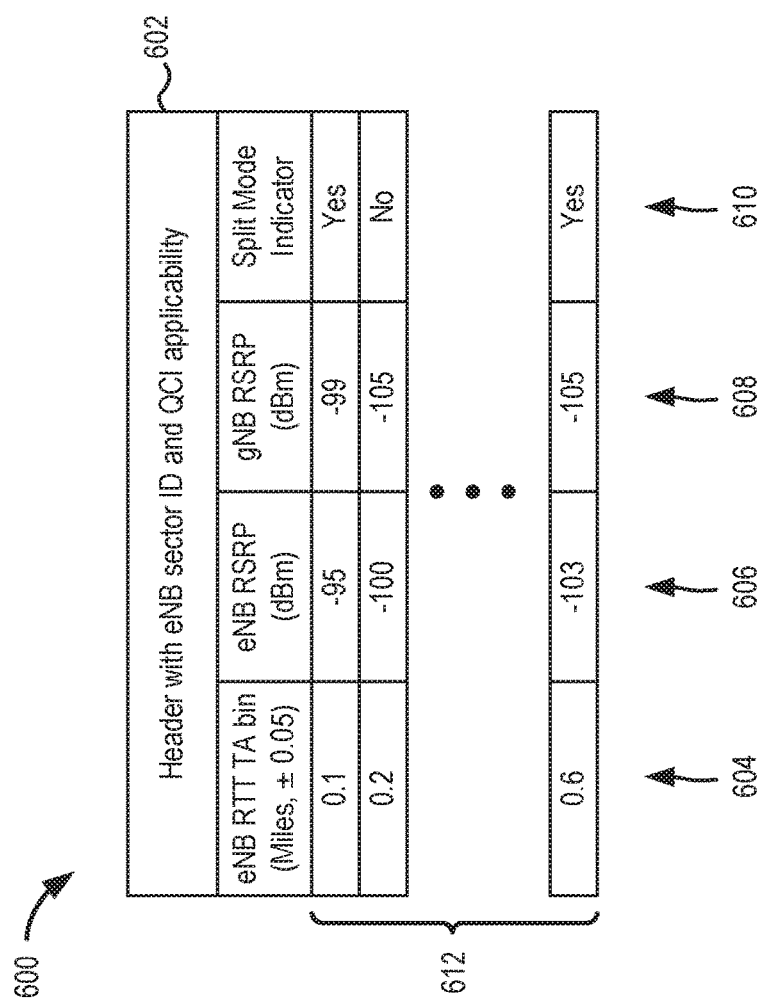
FIG. 6 is a diagram illustrating a portion of an exemplary split bearer decision table, according to an implementation described herein.

FIG. 6 is a diagram illustrating a sample split bearer decision table 600 that may be generated by model generator 510 and used by eNB 125 for split bearer triggering decisions. Referring to FIG. 6, split bearer decision table 600 may include applicability parameters 602, distance bin field 604, a 4G signal strength field 606, a 5G NR signal strength field 608, a split mode decision field 610, and a variety of records or entries 612 associated with each of fields 604-610.

Applicability parameters 602 may identify an applicable sector 215 to which split bearer decision table 600 is applicable. For example, applicability parameters 602 may include a unique eNB identifier and sector identifier within a cell 210. Applicability parameters 602 may also identify applicable bearer types to which split bearer decision table 600 should be applied. For example, applicability parameters 602 may include one or more quality control indicators (e.g., QoS Class Identifiers (QCIs)) or another bearer-type indicators to which split bearer decision table 600 applies. According to an exemplary implementation, applicability parameters 602 may indicate split bearer decision table 600 is applicable for Enhanced Video Telephony (VT) Video (e.g., QCI 6) and/or Best Effort Data, VT Video, Video Streaming (e.g. QCI 8). According to another implementation, applicability parameters 602 may indicate split bearer decision table 600 is applicable for any QCI indicator other than listed exceptions (e.g., Real-time Voice (QCI 1)). In another implementation, a single eNB 125 or sector 215 may have multiple tables with different applicability parameters 602 (e.g., a split bearer decision table 600 for QCI 6 and a different split bearer decision table 600 for QCI 7).

Distance bin field 604 may indicate a distance range between eNB 125 and an end device 105/110. The distance range may include a range or threshold value which may be calculated, for example, based on a particular frequency and signal round trip time (RTT) timing advance (TA) measurement. If the particular connection corresponds to a Transmission Control Protocol (TCP) connection, the round trip time may be determined based on an RTT counter associated with the TCP connection. If the particular connection corresponds to a user datagram protocol (UDP) connection, the round trip time may be determined by estimating the round trip time using a request response cycle. In the example of FIG. 6, entries in distance bin field 604 are represented in terms of physical distance (e.g., miles), although any indicator or category may be used. Distance values in distance bin field 604 may correspond to a radius range within the cell 210 or sector 215 (e.g., "0.1" may represent a radius of between 0.05 and 0.015 miles from eNB 125). In other implementations, ranges in distance bin field 604 may use time values that correlate to distances. For example, for a given 4G signal frequency, model generator 510 may account for an expected processing delay, queuing delay, and encoding delay in a RTT signal value to calculate signal propagation time and a corresponding signal travel distance.

4G signal strength field 606 may include an expected RSRP value for a corresponding distance in distance bin field 604. For example, as shown in FIG. 6, model generator 510 may initially calculate that end devices 105/110 will provide a RSRP value of −95 dBm at distance of 0.1 mile. Using subsequent data from end devices 105/110, model evaluator 520 may determine a moving average for each RSRP value in 4G signal strength field 606 corresponding to a distance bin field 604.

5G NR signal strength field 608 may include an RSRP value (e.g. between EN-DC UE device 110 and one of gNBs 135) for a corresponding distance in distance bin field 604. For example, as shown in FIG. 6, model generator 510 may calculate that EN-DC UE devices 110 will provide a RSRP value of −99 dBm at distance of 0.1 mile. Although a single 5G NR signal strength field 608 is shown in table 600, in other implementations a different 5G NR signal strength field 608 may be included for each cell 220 or sector of cell 220.

Split mode decision field 610 may include a result or decision for triggering a split mode (e.g., whether the current signal strength values will provide a sustainable split bearer). Split mode decision field 610 may include a binary result (e.g., "yes" or "no") with respect to a cell on which split mode is applicable based on the values in distance in distance bin field 604, 4G signal strength field 606, and 5G NR signal strength field 608. According to an implementation, the result (e.g., yes/no) in split mode decision field 610 may be initially based on calculations/estimations and then adjusted based on actual data.

In application, distance bin field 604 and 4G signal strength field 606 may serve as an index for split bearer decision manager 410, while 5G NR signal strength field 608 may serve as a confirmation to indicate the relative context of 5G NR coverage for a EN-DC UE device 110. More particularly, split bearer decision manager 410 may receive a signal strength measurement from EN-DC UE device 110 (e.g., send signal strength measurement 260, FIG. 2C) which may include both a 4G RSRP value and a 5G NR RSRP value. Split bearer decision manager 410 may match the 4G RSRP value to an entry in 4G signal strength field 606 to identify the corresponding bin in distance bin field 604. In another implementation, split bearer decision manager 410 may use another signal measurement, such as a 4G RTT measurement, to estimate a distance for a corresponding bin in distance bin field 604. Within the corresponding bin, split bearer decision manager 410 may match the 5G NR RSRP value to an entry in 5G NR signal strength field 608, if necessary, and identify the appropriate result in split mode decision field 610.

Although FIG. 6 shows an exemplary split bearer decision table 600, in other implementations, split bearer decision table 600 may include different fields, fewer fields, or additional fields than depicted in FIG. 6. For example, in another implementation, split bearer decision table 600 may include additional fields define more complex decisions scenarios or default decisions. Also, in other implementations, split bearer decision table 600 may include another type of data file (e.g., a list, a flat file, a database, etc.).

Figure 7:
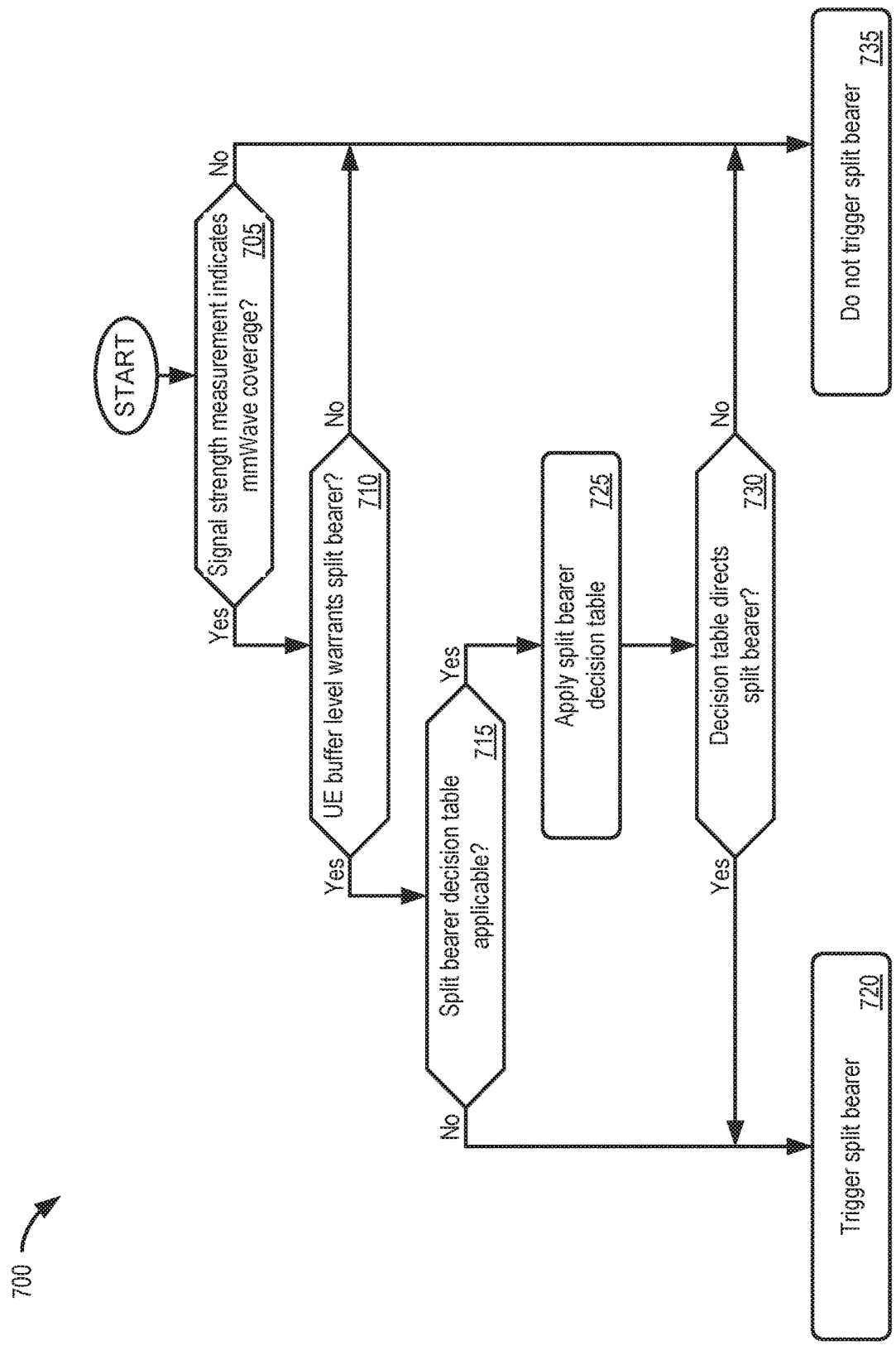
FIG. 7 is flow diagram illustrating an exemplary process for managing split bearer selection in a multi-RAT dual connectivity environment, according to an implementation described herein.

FIG. 7 is a flow diagram illustrating an exemplary process 700 for triggering split bearer activation, according to an implementation described herein. According to an exemplary embodiment, a master wireless station (e.g., eNB 125) may perform steps of process 700. For example, processor 310 may execute software 320 to perform the steps illustrated in FIG. 7, and described herein. In another embodiment, a master wireless station may perform steps of process 700 in conjunction with one or more other devices, such as EN-DC UE device 110 and/or network device 155.

Referring to FIG. 7, it may be determined if a received signal strength measurement indicates mmWave coverage (block 705). For example, master eNB 125 may receive a 5G NR RSRP value from EN-DC UE device 110. The RSRP value may indicate whether EN-DC UE device 110 is receiving adequate mmWave signal strength (e.g., above a minimum threshold) to support a split bearer.

If the received signal strength measurement indicates there is mmWave coverage (block 705—Yes), it may be determined if the UE buffer level warrants a split bearer (block 710). For example, for downlink transmissions, eNB 125 may monitor a buffer level for traffic over an existing bearer for EN-DC UE device 110.

If the UE buffer level warrants a split bearer (block 710—Yes), it may be determined if a split bearer decision table is applicable (block 715). For example, if eNB 125 may determine if a split bearer decision table (e.g., split bearer decision table 600) is available for the particular sector (e.g. sector 215) and bearer-type (e.g., as indicated by a QCI indicator) corresponding to EN-DC UE device 110. Additionally, or alternatively, eNB 125 may assess whether the 5G NR RSRP value from EN-DC UE device 110 is stronger than a default threshold, obviating the need for using the split bearer decision table. For example, if 5G NR RSRP value from EN-DC UE device 110 indicates very strong coverage (e.g., above −90 dBm), eNB 125 may determine use of a split bearer decision table is not necessary.

If a split bearer decision table is not applicable (block 715—No), a split bearer mode may be triggered (block 720). For example, if eNB 125 does not have an applicable table for the particular sector and bearer type, or if the measured signal strength is above a threshold, eNB 125 may presume the current signal strength measurements will provide a sustainable split bearer and initiate a split bearer mode for EN-DC UE device 110 to attach to a gNB 135.

If a split bearer decision table is applicable (block 715—Yes), a split bearer decision table may be applied (block 725) and it may be determined if the decision table directs a split bearer (block 730). For example, eNB 125 may apply an appropriate split bearer decision table that corresponds to the sector and bearer type for EN-DC UE device 110 to determine if signal strength measurements provided by EN-DC UE device 110 are indicative of gNB 135 providing a sustainable split bearer. eNB 125 may match the 4G RSRP measurements and the 5G NR RSRP measurements from EN-DC UE device 110, and the eNB-calculated Timing Advance (TA) distance with values in the split bearer decision table to identify the appropriate bin (e.g., in distance bin field 604) and result (e.g., in split mode decision field 610) of the split bearer decision table.

If the decision table directs a split bearer (block 730—Yes), split bearer mode may be triggered as described above in block 720. For example, if the 4G RSRP measurements and 5G NR RSRP measurements from EN-DC UE device 110 are matched to a "yes" result in split mode decision field 610, eNB 125 may provide instructions for gNB 135 to establish a connection with EN-DC UE device 110.

If the received signal strength measurement does not indicate there is mmWave coverage (block 705—No), or if the UE buffer level does not warrant a split bearer (block 710—No), or if the decision table does not directs a split bearer mode (block 730—No), a split bearer mode may not be triggered (block 735). For example, eNB 125 may take no split bearer action for EN-DC UE device 110 and return to process block 705 to continue to receive signal strength measurements.

Although FIG. 7 illustrates an exemplary process 700 for enforcing cell selection to prioritize voice calls, process 700 may include additional operations, fewer operations, different operations, and/or differently-ordered operations than those illustrated in FIG. 7, and described herein.

Systems and methods described herein manage split bearer selection in a multi-RAT dual connectivity environment. A first wireless station receives, from an end device, a first signal measurement (e.g., an RSRP or RTT signal measurement) for the first wireless station and a second signal measurement (e.g., another RSRP measurement) for a second wireless station. The first wireless station determines that the second signal measurement indicates that a split bearer for the end device can be supported by the second wireless station and identifies, based on the first signal measurement, a distance category for the end device relative to the first wireless station. The first wireless station determines, based on the second signal measurement, whether the second wireless station supports a sustainable split bearer and initiates a split bearer for the end device using the second wireless station, when it is determined that the second wireless station supports a sustainable split bearer.

In contrast with systems that rely on UE RF measurements to determine if an end device is a candidate for a split bearer, systems and methods described herein use both network information and UE RF information to trigger split bearer behavior. Implementations described herein provide reliability to hold sessions with continuity requirements, such as Voice/Video/Gaming sessions, as the end device traverses through areas with mmWave gNBs. Furthermore, implementations described herein enable wireless stations to making effective split bearer decisions without compromising subscriber privacy and/or using end device location data.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information provided by individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:
    receiving, by a first wireless station and from a first device, a first signal measurement for the first wireless station and a second signal measurement for a second wireless station;
    determining, by the first wireless station, that the second signal measurement indicates that a split bearer for the first device can be supported by the second wireless station;
    identifying a quality control class for an existing bearer used by the first device;
    identifying a sector, of the first wireless station, where the first device is located;
    determining, by the first wireless station, decision parameters applicable to the sector and the quality control class, wherein the decision parameters are from a group of unique decision parameters for different sectors and quality control classes;
    identifying, by the first wireless station and based on the first signal measurement, a distance category associated with the first device relative to the first wireless station;
    determining, by the first wireless station, based on the second signal measurement, the distance category, and the decision parameters, whether the second wireless station supports a sustainable split bearer; and
    initiating, by the first wireless station, the split bearer for the first device using the second wireless station, in response to determining that the second wireless station supports the sustainable split bearer.

2. The method of claim 1, wherein the distance category identifies a radius range from the first wireless station.

3. The method of claim 1, further comprising:
    storing a different decision table for each set of decision parameters of the group of unique decision parameters.

4. The method of claim 1, wherein the second wireless station uses a millimeter wave (mmWave) radio frequency.

5. The method of claim 1, wherein determining whether the second wireless station supports a sustainable split bearer comprises:
    retrieving, from a memory, a decision table, of multiple different decision tables, configured for the quality control class and the sector where the first device is located; and
    determining, using the first signal measurements and the second signal measurement, a split mode indicator result in the decision table.

6. The method of claim 1, further comprising:
    receiving, from a network device, the group of unique decision parameters.

7. The method of claim 1, wherein the first wireless station comprises a base station for an Evolved Universal Mobile Telecommunications System (UMTS) Terrestrial Radio Access Network (E-UTRAN), and wherein the second wireless station comprises a base station for a new radio (NR) radio access network.

8. The method of claim 1, wherein the first signal measurement includes a first Reference Signal Receive Power (RSRP) measurement, and wherein the second signal measurement includes a second RSRP measurement.

9. The method of claim 1, wherein the first device is a Dual Connectivity capable device.

10. The method of claim 1, wherein identifying the distance category is further based on identifying a signal frequency and a signal round trip time between the first wireless station and the first device.

11. A first wireless station comprising:
    a communications interface;
    and
    a processor configured to:
        receive, from a first device, a first signal measurement for the first wireless station and a second signal measurement for a second wireless station;
        determine that the second signal measurement indicates that a split bearer for the first device can be supported by the second wireless station;

identify a quality control class for an existing bearer used by the first device;

identify a sector, of the first wireless station, where the first device is located;

determine decision parameters applicable to the sector and the quality control class, wherein the decision parameters are from a group of unique decision parameters for different sectors and quality control classes;

identify, based on the first signal measurement, a distance category of the first device relative to the first wireless station;

determine, based on the second signal measurement, the distance category, and the decision parameters, whether the second wireless station supports a sustainable split bearer; and initiate the split bearer for the first device using the second wireless station, in response to determining that the second wireless station supports the sustainable split bearer.

12. The first wireless station of claim 11, wherein the distance category identifies a radius range from the first wireless station.

13. The first wireless station of claim 11, wherein the processor is further configured to store a different decision table for each set of decision parameters of the group of unique decision parameters.

14. The first wireless station of claim 11, wherein the second wireless station uses a millimeter wave (mmWave) radio frequency.

15. The first wireless station of claim 11, wherein, when determining whether the second wireless station supports the sustainable split bearer, the processor is further configured to:

retrieve, from a memory, a decision table, of multiple different decision tables, configured for the quality control class and the sector where the first device is located; and determine, using the first signal measurements and the second signal measurement, a split mode indicator result in the decision table.

16. The first wireless station of claim 11, wherein the processor is further configured to:

receive, from a network device in a core network, the group of unique decision parameters.

17. The first wireless station of claim 11, wherein the first wireless station comprises an eNodeB for an Evolved Universal Mobile Telecommunications System (UMTS) Terrestrial Radio Access Network (E-UTRAN).

18. The first wireless station of claim 11, wherein the first signal measurement includes a first Reference Signal Receive Power (RSRP) measurement, and wherein the second signal measurement includes a second RSRP measurement.

19. A non-transitory, computer-readable storage media storing instructions executable by one or more processors of one or more devices, which when executed cause the one or more devices to:

receive, from an first device, a first signal measurement for a first wireless station and a second signal measurement for a second wireless station;

determine that the second signal measurement indicates that a split bearer for the first device can be supported by the second wireless station;

identify a quality control class for an existing bearer used by the first device;

identify a sector, of the first wireless station, where the first device is located;

determine decision parameters applicable to the sector and the quality control class, wherein the decision parameters are from a group of unique decision parameters for different sectors and quality control classes;

identify, based on the first signal measurement, a distance category of the first device relative to the first wireless station;

determine, based on the second signal measurement, the distance category, and the decision parameters, whether the second wireless station supports a sustainable split bearer; and initiate the split bearer for the first device using the second wireless station, in response to determining that the second wireless station supports the sustainable split bearer.

20. The non-transitory, computer-readable storage media of claim 19, further comprising instructions to cause the one or more devices to:

retrieve a decision table for each sector of the first wireless station, wherein each decision table includes decision parameters for determining whether other wireless stations within the sector support sustainable split bearers.

* * * * *